UNITED STATES PATENT OFFICE.

HARRY C. HAGMAIER, OF PITTSBURGH, PENNSYLVANIA, ASSIGNOR TO UNITED STATES PRODUCTS COMPANY, OF PITTSBURGH, PENNSYLVANIA, A CORPORATION OF PENNSYLVANIA.

BEARING-FITTING COMPOUND.

1,361,719.   Specification of Letters Patent.   Patented Dec. 7, 1920.

No Drawing.   Application filed June 30, 1920.   Serial No. 393,085.

*To all whom it may concern:*

Be it known that I, HARRY C. HAGMAIER, a citizen of the United States, residing at Pittsburgh, in the county of Allegheny and State of Pennsylvania, have invented certain new and useful Improvements in Bearing-Fitting Compounds, of which the following is a specification.

My invention consists of an improvement in bearing fitting compounds for Babbitt, brass, bronze, and all other soft metal bearings.

It has for its object to produce a suitable mixture, composed of the ingredients hereinafter described, in approximately the proportions given, which can be used to quickly smooth or wear in the surfaces of bearings for shafts, spindles, or similar mechanism, and which will maintain its condition, when made, as a serviceable and commercial commodity for its intended use, without deterioration or effect of temperature, time, or climatic conditions.

In making my compound, I use the following ingredients in or about the following proportions, to wit:

| | |
|---|---|
| Silica | 22.25% |
| White lead | 22.25% |
| Graphite | 44.50% |
| Sodium carbonate | 11.  % |
| Total | 100.  % |

These ingredients are mixed together in about the proportions above noted, more or less, and thoroughly commingled and amalgamated so as to produce a composite mass or resulting substance in the nature of a dry powder, with the several ingredients equally and thoroughly commingled with each other throughout. The mixture is used with sufficient oil to make it plastic and easily applied and distributed.

The silica is preferably substantially pure commercial silica having the usual qualities as to sharp abrasive action, and is comparatively fine in grain. That is to say, dependent upon the particular use to which the compound is to be put for its action on comparatively soft bearings, it may be either coarse, medium, or fine. When coarse, it is of a size to pass through a screen of about 80 mesh to the inch; medium, of about 100 mesh to the inch; and fine, of about 200 mesh to the inch. I prefer to use a silica derived from an originally compact solid deposit, and free from either natural or other porosity producing cavities.

The white lead is the usual commercial white lead of commerce, and acts as a plastic body and binder for the contained ingredients.

The graphite is preferably of comparatively fine grade and small size, so as to avoid the presence of any particles of appreciable size and without flakes.

The sodium carbonate is of ordinary commercial quality.

The several ingredients, after having been mixed in the manner described, are packed in containers of any suitable size or shape, and the material, when mixed with oil, is used in such quantities as to thoroughly cover the surfaces which, by their rubbing or revolving contact, are to be reduced to a good wearing bearing, as is commonly understood by those familiar with the art. The mixture, as made, is capable of quickly reducing the bearing, with the effect of a resulting fine, smooth surface upon the bearing, but without affecting the smooth surface of the contained journal or spindle.

A comparatively small amount used in the manner of a coating is sufficient, and the economy and efficiency of the invention resides in the comparatively small cost of the several ingredients, the absence of necessity of highly skilled labor or apparatus in its manufacture, while the results in use are directly dependent upon the several materials utilized in or about the proportions given.

While excellent results have been secured by the proportions noted in the specification, it will, of course, be obvious that these may be varied from within certain limits, while still retaining the substantial advantages of the general composition, utilizing the substance in the manner above described.

Having thus described my invention, what I claim is:

1. A bearing fitting compound composed of silica, white lead, graphite, and sodium, substantially as described.

2. A bearing fitting compound composed of approximately 22.25% of silica, 22.25% of white lead, 44.50% of graphite, and 11% of sodium carbonate, substantially as described.

In testimony whereof I hereunto affix my signature.

HARRY C. HAGMAIER.